US009504939B2

(12) United States Patent  
Kamp et al.

(10) Patent No.: US 9,504,939 B2
(45) Date of Patent: Nov. 29, 2016

(54) FILTER ASSEMBLY
(71) Applicant: Caterpillar Inc., Peoria, IL (US)
(72) Inventors: Nathaniel R. Kamp, Peoria, IL (US); Mark T. Allott, Mapleton, IL (US); Jeffrey R. Ries, Metamora, IL (US)
(73) Assignee: Caterpillar Inc., Peoria, IL (US)
( * ) Notice: Subject to any disclaimer, the term of this patent is extended or adjusted under 35 U.S.C. 154(b) by 239 days.
(21) Appl. No.: 14/221,379
(22) Filed: Mar. 21, 2014
(65) Prior Publication Data
US 2014/0284266 A1  Sep. 25, 2014

Related U.S. Application Data

(60) Provisional application No. 61/804,504, filed on Mar. 22, 2013.

(51) Int. Cl.
| | | |
|---|---|---|
| *B01D 29/15* | (2006.01) | |
| *B01D 35/00* | (2006.01) | |
| *B01D 35/153* | (2006.01) | |
| *B01D 35/16* | (2006.01) | |

(52) U.S. Cl.
CPC ............ *B01D 35/005* (2013.01); *B01D 29/15* (2013.01); *B01D 35/153* (2013.01); *B01D 35/16* (2013.01); *B01D 2201/0415* (2013.01); *B01D 2201/316* (2013.01); *B01D 2201/4046* (2013.01); *B01D 2201/4053* (2013.01); *B01D 2201/4076* (2013.01)

(58) Field of Classification Search
None
See application file for complete search history.

(56) References Cited

U.S. PATENT DOCUMENTS

| 7,335,300 B1 | 2/2008 | Stamey, Jr. et al. | |
| 7,857,974 B2 | 12/2010 | Jiang | |
| 7,887,701 B2* | 2/2011 | Schmid | B01D 35/153 |
| | | | 210/248 |
| 8,168,066 B2 | 5/2012 | Wieczorek et al. | |
| 2006/0207948 A1 | 9/2006 | Hacker et al. | |
| 2010/0230342 A1* | 9/2010 | Jainek | B01D 35/147 |
| | | | 210/232 |
| 2011/0005996 A1 | 1/2011 | Jainek | |
| 2011/0073537 A1* | 3/2011 | Allott | B01D 35/153 |
| | | | 210/232 |
| 2011/0073538 A1 | 3/2011 | Jiang et al. | |
| 2012/0261326 A1* | 10/2012 | Deschamps | B01D 29/96 |
| | | | 210/236 |

FOREIGN PATENT DOCUMENTS

| CN | 201361481 | 12/2009 |
| CN | 102648036 | 8/2012 |

(Continued)

*Primary Examiner* — Benjamin Kurtz
(74) *Attorney, Agent, or Firm* — Finnegan, Henderson, Farabow, Garrett & Dunner, LLP (57) ABSTRACT

A filter element includes a substantially cylindrical center tube having a first end, a second end opposite the first end, and a central longitudinal axis. The filter element also includes filter media extending circumferentially around and longitudinally along the center tube, and a plate connected to the center tube proximate the first end. The plate includes an orifice and a cap. The orifice includes a pilot feature configured to locate the filter element at a single circumferential position relative to the longitudinal axis, the cap extending from a top surface of the plate toward the second end and having an inner wall configured to mate with a drain plug. In such embodiments, the orifice and the cap are disposed radially inward of an inner circumference of the center tube, and at least one of the orifice and the cap extends circumferentially around an additional longitudinal axis spaced radially from the central longitudinal axis of the center tube.

17 Claims, 6 Drawing Sheets

(56) References Cited

FOREIGN PATENT DOCUMENTS

| DE | 202008013578 | 3/2009 |
| DE | 102009049868 | 4/2011 |
| EP | 0 323 701 | 7/1989 |
| JP | 2006082010 | 3/2006 |

* cited by examiner

FILTER ASSEMBLY

RELATED APPLICATION

This application claims the benefit of priority under 35 U.S.C. §119(e) of U.S. Provisional Application No. 61/804,504, filed Mar. 22, 2013, the disclosure of which is incorporated herein by reference.

TECHNICAL FIELD

The present disclosure relates to a filter assembly, and more particularly, to a filter assembly having pilot features used to locate a filter element.

BACKGROUND

Many systems include filter assemblies having a filter element for filtering fluid. Such filter assemblies may include one or more seals configured to form a fluid seal at the interface between the filter element and an external filter canister. Such seals may also serve to locate the filter element radially during the process of mounting the filter element and/or after the filter element is mounted. Such systems may also include a drain configured to remove fluid from the canister. Such drains typically necessitate the use of one or more drain valves connected to the canister. Regardless of their configuration, such drains may mate with the filter element and the canister to either open or close a drain passage for removing fluid from the canister.

U.S. Pat. No. 8,168,066 to Wieczorek et al. ("the '066 patent") discloses an exemplary filter system. The system of the '066 patent includes a filter housing, a clean fluid passage disposed axially in the housing, and a service drain passage disposed at an axial end of the housing and spaced from the clean fluid passage. The system also includes a stand pipe defining a portion of the clean fluid passage, and a plug extending from a filter cartridge. The plug fluidly blocks the drain passage when the filter cartridge is installed within the filter housing.

Filter systems of the type disclosed in the '066 patent, however, have several deficiencies. For instance, the drain passages of such filter systems typically embody a protrusion extending axially away from a bottom end of the filter cartridge, and the plug is removably disposed within the drain passage during use. This drain configuration, however, extends the axial length of the filter system and increases its overall footprint. Such an increase in length may be problematic for applications in which space is tightly constrained. Additionally, in order to remove fluid from the filter housing, the plug must be fully removed from the drain passage. Such complete removal of the plug increases the likelihood of misplacing or losing the plug during routine maintenance procedures. Moreover, filter systems of the type disclosed in the '066 patent do not typically provide structures for circumferential alignment of the filter cartridge, such as relative to a central longitudinal axis, when installing the filter cartridge in the housing.

The various embodiments of the present disclosure are directed toward overcoming one or more deficiencies of the prior art.

SUMMARY

In an exemplary embodiment of the present disclosure, a filter element includes a substantially cylindrical center tube having a first end, a second end opposite the first end, and a central longitudinal axis. The filter element also includes filter media extending circumferentially around and longitudinally along the center tube, and a plate connected to the center tube proximate the first end. The plate includes an orifice and a cap. The orifice includes a pilot feature configured to locate the filter element at a single circumferential position relative to the longitudinal axis, the cap extending from a top surface of the plate toward the second end and having an inner wall configured to mate with a drain plug. In such embodiments, the orifice and the cap are disposed radially inward of an inner circumference of the center tube, and at least one of the orifice and the cap extends circumferentially around an additional longitudinal axis spaced radially from the central longitudinal axis of the center tube.

In another exemplary embodiment of the present disclosure, a filter assembly includes a support structure having a stand pipe and a flange connected to the stand pipe, the stand pipe having a first central longitudinal axis, and the flange having a drain port configured to mate with a drain plug. The filter assembly also includes a filter element removably connected to the support structure. The filter element includes a substantially cylindrical center tube. The center tube includes a first end, a second end opposite the first end, an inner wall forming an inner circumference of the center tube, and a second central longitudinal axis. The filter element also includes a plate connected to the center tube proximate the first end. The plate includes an orifice and a cap, the orifice mating with the stand pipe to locate the filter element at a single circumferential position relative to the first longitudinal axis of the stand pipe. The cap extending from a top surface of the plate toward the second end and having an inner wall forming a substantially fluid-tight seal with the flange. The stand pipe, the orifice, and the cap are disposed radially inward of the inner circumference of the center tube. Additionally, the first longitudinal axis of the stand pipe is spaced radially from the second longitudinal axis of the center tube.

In a further exemplary embodiment of the present disclosure, a filter assembly includes a housing and a support structure disposed within the housing, the support structure including a stand pipe and flange having a drain port. The stand pipe extends substantially perpendicularly from a base of the housing and includes a first central longitudinal axis. The drain port is configured to form a substantially fluid-tight seal with a drain plug. The assembly also includes a filter element removably disposed within the housing. The filter element includes a substantially cylindrical center tube having a second central longitudinal axis, a plate connected to the center tube, and filter media extending circumferentially around and longitudinally along the center tube. The stand pipe extends through an orifice of the plate and mates with a pilot feature formed by the orifice. The pilot feature locates the filter element at a single circumferential position relative to the first longitudinal axis of the stand pipe, and an outer wall of the flange forms a substantially fluid-tight seal with an inner wall of the plate. In such embodiments, the stand pipe, the drain plug, and the inner wall of the plate are disposed radially within an inner circumference of the center tube. The drain port having a third central longitudinal axis substantially parallel to and spaced radially from the first longitudinal axis of the stand pipe and the second longitudinal axis of the center tube.

DETAILED DESCRIPTION

Figure 1:
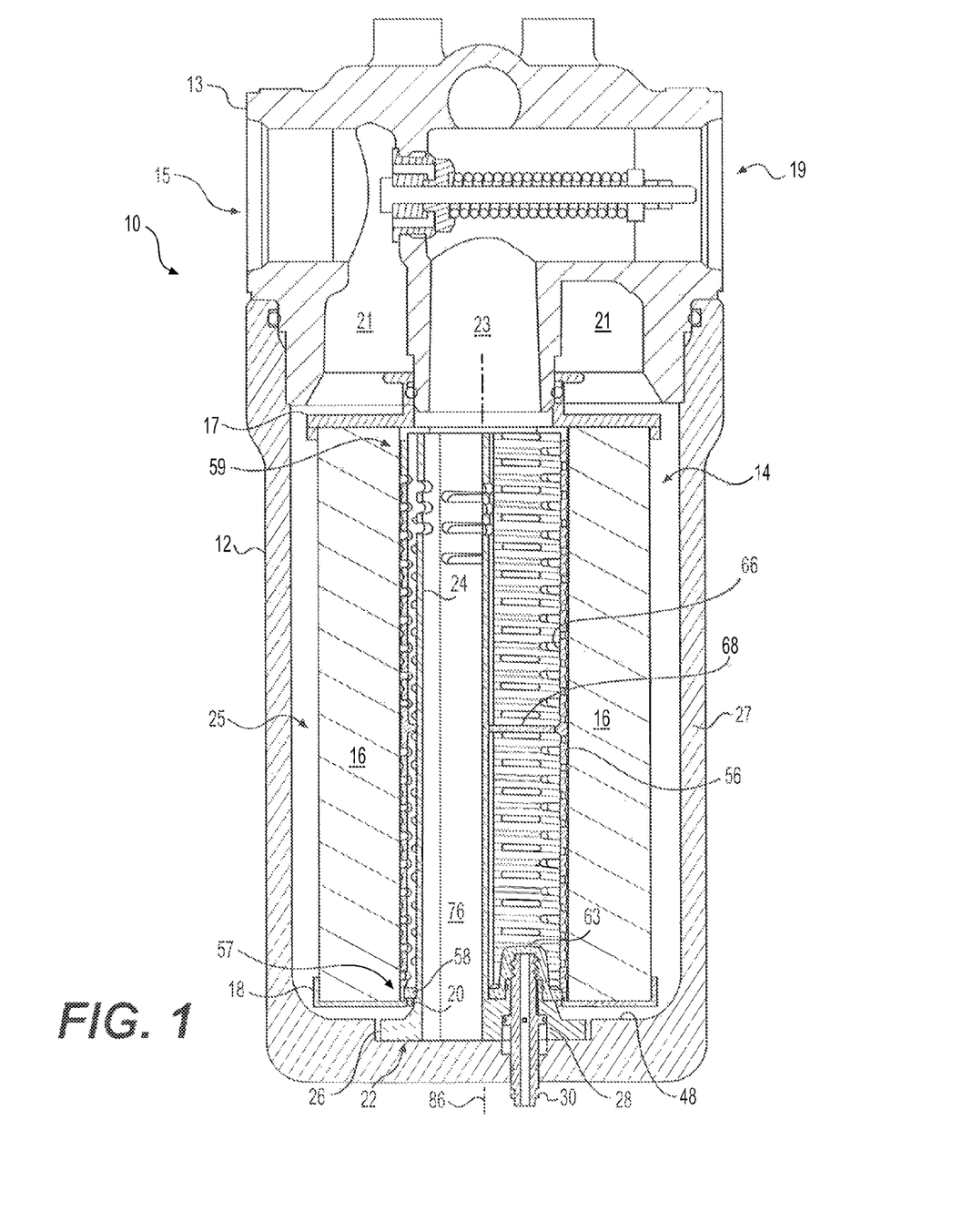
FIG. 1 shows a longitudinal cross-sectional view of a filter assembly according to an exemplary embodiment of the present disclosure.
Figure 6:
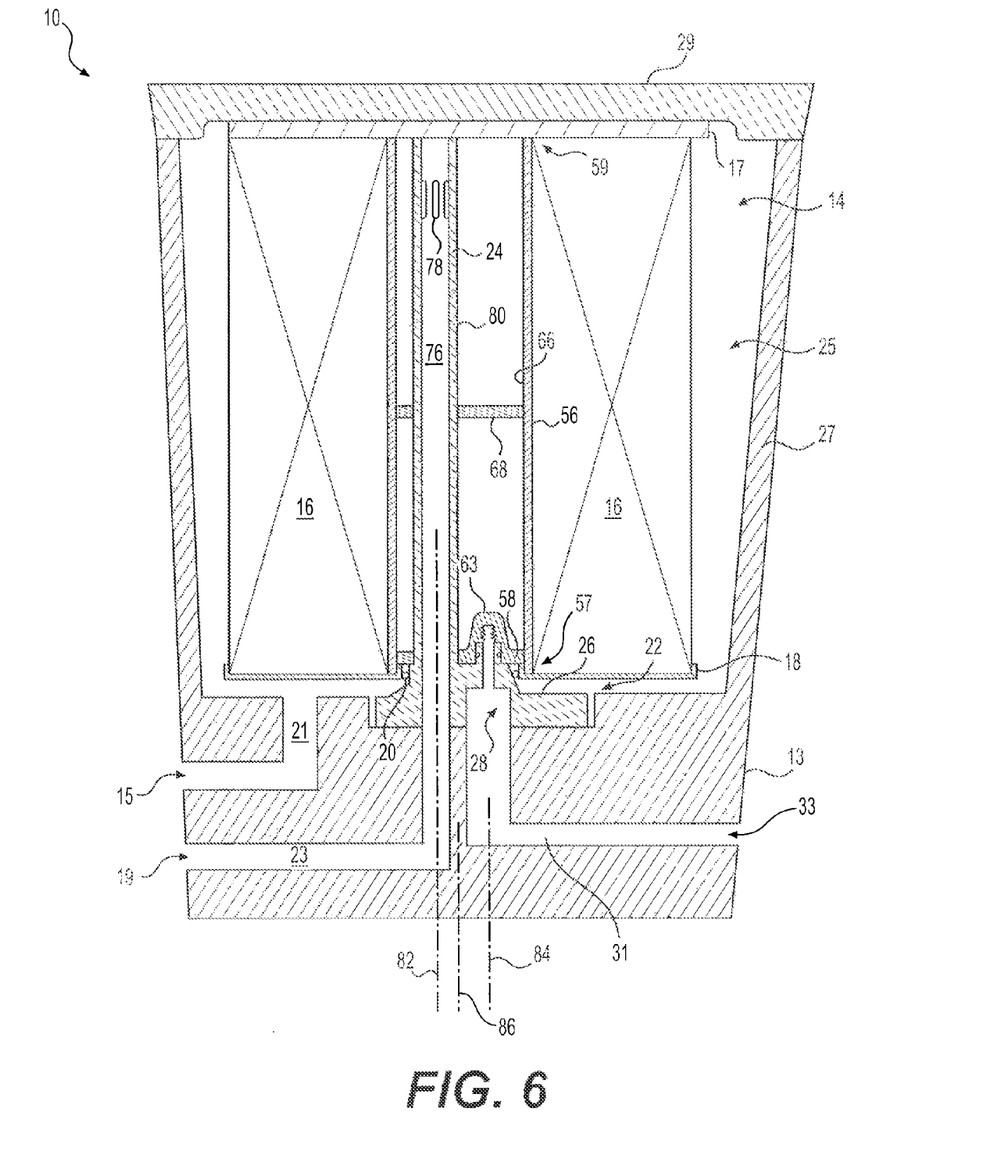
FIG. 6 shows a longitudinal cross-sectional view of a filter assembly according to another exemplary embodiment of the present disclosure.

FIGS. 1 and 6 illustrate exemplary filter assemblies 10 of the present disclosure. As shown in at least FIG. 1, filter assembly 10 may include an outer housing 12. Housing 12 may be configured to mate with another housing, base, chassis or other like head 13, and head 13 may be configured to direct fluid to and/or receive fluid from housing 12. Filter assembly 10 may also include, among other things, a support structure 22 having a stand pipe 24, a flange 26 connected to stand pipe 24, and a drain port 28 formed by flange 26 adjacent to stand pipe 24. Filter assembly 10 may further include a filter element 14 removably connected to support structure 22. Filter element 14 may include, for example, a substantially cylindrical center tube 56, and a plate 58 connected to center tube 56 proximate a first end 57 of center tube 56. Filter element 14 may also include filter media 16 extending circumferentially around and longitudinally along center tube 56, such as, along an outer wall of center tube 56. Each of these components will be described in greater detail below with respect to FIGS. 1-6.

In the exemplary embodiment illustrated in FIG. 1, filter assembly 10 may comprise a "bottom load" assembly in which housing 12 and filter element 14 are connected to an underside of head 13, and filter element 14 is disposed within housing 12 during use. In alternative embodiments, however, it is understood that the various components, structures, configurations, and/or methods described herein may be employed in a "top load" assembly in which filter element 14 is connected to a top of head 13, and is disposed substantially within outer sidewalls of head 13 during use. Such an exemplary top load configuration is illustrated in FIG. 6. Like numbers have been used in FIGS. 1-6 to illustrate like components employed in both top load and bottom load configurations, and the various components, functions, configurations, advantages, and other aspects of this disclosure are applicable to both top load and bottom load filter assemblies 10. In the top load embodiment shown in FIG. 6, however, it is understood that the orientation, location, and/or other configurations of one or more filter assembly components may be reversed or otherwise modified relative to the bottom load embodiment of FIG. 1 without departing from the scope of this disclosure. For ease of description, the exemplary bottom load embodiment shown in FIG. 1 will be described below unless otherwise specified.

Filter media 16 may include any material or materials configured to filter fluid flowing through it. In some embodiments, filter media 16 may include cellulose material, spun polyester, micro glass fibers, or any other filtering materials. Filter media 16 may include a single layer of filter material, such as cellulose filter material. Alternatively, filter media 16 may include multiple layers of filter material integrally constructed. For example, filter media 16 may include a base of cellulose material with a coating of melt-blown polyester. Filter media 16 may have various shapes. In some embodiments, filter media 16 may be a sheet of material folded into longitudinal pleats (i.e., pleats whose folds extend parallel to a central longitudinal axis 86 of center tube 56) spaced around center tube 56. Similarly, filter element 14 may also include various types of reinforcing structures disposed inside or outside of filter media 16, and/or between any other layers of filter media that filter element 14 may include.

In addition to filter media 16, filter element 14 may include various other structures. For example, filter element 14 may include endcaps 17, 18 adjacent axial ends of filter media 16. Endcaps 17, 18 may have various shapes. In some embodiments, each endcap 17, 18 may have a generally plate-like, generally annular shape, and endcaps 17, 18 may extend around longitudinal axis 86. Filter element 14 may or may not have one or more openings through endcaps 17, 18. In the example shown in FIG. 1, endcaps 17, 18 include central openings through which longitudinal axis 86 extends. Alternatively, as shown in FIG. 6, such a central opening may be omitted in at least endcap 17. In such embodiments, endcap 17 may mate with a cap 29 of head 13 configured to form a substantially fluid-tight seal with head 13 and endcap 17. For convenience of discussion, the area adjacent endcap 17 may be considered a top area, and endcap 1 may comprise a top endcap of filter element 14. Likewise, the area adjacent endcap 18 may be considered a bottom area, and endcap 18 may comprise a bottom endcap of filter element 14. It is understood, however, that the use of the terms "top" and "bottom" is not intended to be limiting regarding the actual vertical orientation of any portion of filter assembly 10.

Endcaps 17, 18 may be constructed of various materials and attached to filter media 16 in various ways. In some embodiments, endcaps 17, 18 may be constructed of a rigid material, such as plastic. Endcaps 17, 18 may be attached directly or indirectly to filter media 16. In some embodiments, axially inner surfaces of endcaps 17, 18 may be attached directly to filter media 16. This may be accomplished by gluing axial end portions of filter media 16 to endcaps 17, 18, embedding axial end portions of filter media 16 in endcaps 17, 18, or by any other suitable means of affixing filter media 16 to endcaps 17, 18.

Center tube 56 of filter element 14 may comprise any substantially rigid, substantially hollow, substantially cylindrical structure configured to support filter media 16. Center tube 56 may be made from metals, alloys, plastics, polymers, and/or any other like materials configured to form a substantially rigid filtration component. When filter assembly 10 is in its assembled state, as shown in FIG. 1, center tube 56 may extend substantially perpendicular to a base 48 of housing 12. Alternatively, as shown in FIG. 6, center tube 56 may extend substantially perpendicular to a base of housing 13. A second end 59 of center tube 56 may mate with endcap 17 and/or head 13. For example, second end 59 may be connected to an underside of endcap 17. Alternatively, second end 59 may extend through a central opening of endcap 17, and into an outlet channel 23 of head 13. In exemplary embodiments, center tube 56 may be disposed inside of filter media 16, between endcaps 17, 18, and may include a generally cylindrical inner wall 66 extending circumferentially around and longitudinally along longitudinal axis 86. Center tube 56 may include a plurality of openings through which fluid can pass between a space radially outward of center tube 56 to a space radially inward of inner wall 66. For example, filter media 16 may be disposed on an outer wall of center tube 56 opposite inner wall 66, and such openings may permit fluid to pass from filter media 16, through the outer wall of center tube 56, to a space radially inward of inner wall 66. In exemplary embodiments, inner wall 66 may define an inner circumference of center tube 56 and the outer wall of center tube 56 may define an outer circumference of center tube 56. Likewise, inner wall 66 and/or inner circumference may define a substantially cylindrical internal volume of center tube 56. As will be described below, at least one of stand pipe 24, drain port 28, plate 58, and/or components or structures thereof, may be disposed at least partially axially within internal volume of center tube 56.

Center tube 56, filter media 16, endcaps 17, 18, and other components of filter element 14 may be removably disposed within housing 12 and/or head 13, and may be positioned on, adjacent, or proximate base 48 or a base of head 13) during use. For example, housing 12 may be substantially cup-shaped and may define an empty internal space within which filter element 14 may be disposed during operation. As shown in FIG. 1, base 48 may extend generally radially outward relative to longitudinal axis 86 of center tube 56, and may extend generally parallel to, for example, endcaps 17, 18. A substantially cylindrical sidewall 27 of housing 12 may connect to a radially outer portion of base 48, and sidewall 27 may extend circumferentially around longitudinal axis 86. For example, sidewall 27 of housing 12 may substantially surround filter element 14 such that a substantially annular gap 25 is formed between filter media 16 and sidewall 27. Sidewall 27 may also include an open end opposite base 48 through which filter element 14 may be inserted and removed. The open end of sidewall 27 may engage head 13 in any known way. For example, the open end may include a threaded portion configured to mate with a corresponding threaded portion of head 13. Additionally, sidewall 27 and/or head 13 may include one or more O-rings, gaskets, or other like sealing structures to form a substantially fluid-tight seal between housing 12 and head 13 when the open end is engaged with head 13. As shown in FIG. 1, when sidewall 27 is secured to head 13, housing 12 and head 13 may substantially enclose filter element 14 and center tube 56, thereby holding filter assembly 10 together.

Alternatively, in the to load embodiment shown in FIG. 6, sidewall 27 may comprise a sidewall of head 13. In such embodiments, filter element 14 may be disposed within sidewall 27 of head 13, and cap 29 may form a substantially fluid-tight seal with sidewall 27 at an open end thereof. The open end of sidewall 27 may engage cap 29 in any known way. For example, the open end may include a threaded portion configured to mate with a corresponding threaded portion of cap 29. Additionally, sidewall 27 and/or cap 29 may include one or more O-rings, gaskets, or other like scaling structures to form a substantially fluid-tight seal between cap 29 and head 13 when the open end is engaged with cap 29. As shown in FIG. 6, when cap 29 is secured to sidewall 27 of head 13, cap 29 and head 13 may substantially enclose filter element 14 and center tube 56, thereby holding filter assembly 10 together.

In the bottom load embodiment of FIG. 1, head 13 may have provisions for directing fluid into housing 12 to be filtered, and for directing the filtered fluid out of housing 12. The provisions for directing fluid into housing 12 for filtering may include an inlet port 15 having, for example, an annular opening in fluid communication with a pump, engine, manifold, or other like supply of unfiltered fluid. Inlet port 15 may also be fluidly connected to gap 25 via one or more inlet channels 21 formed in head 13. For directing fluid out of housing 12, head 13 may include an outlet port 19 having an annular opening in fluid communication with an engine, manifold, rail, or other like component requiring a supply of filtered fluid. Outlet port 19 may also be fluidly connected to inner wall 66 and/or the internal volume of center tube 56 via an outlet channel 23 formed by head 13. Accordingly, during use, fluid may flow from inlet port 15, through filter media 16, to outlet port 19 in the following manner. First, unfiltered fluid may flow from inlet port 15 to annular gap 25 via inlet channels 21. This fluid may then flow through filter media 16 and openings of center tube 56, in a radially inward direction (relative to longitudinal axis 86), into the internal volume of center tube 56. From there, the filtered fluid may flow axially within center tube 56, into outlet channel 23, and to outlet port 19.

In the top load embodiment shown in FIG. 6, on the other hand, head 13 may have similar provisions for directing fluid into head 13 to be filtered, and for directing the filtered fluid out of head 13. For example, during use, unfiltered fluid may flow from inlet port 15 to annular gap 25 via inlet channels 21. This fluid may then flow through filter media 16 and openings of center tube 56, in a radially inward direction (relative to longitudinal axis 86). Upon passing to the internal volume of center tube 56, such filtered fluid may flow into a central channel 76 of stand pipe 24 via a plurality of passages 78. From central channel 76, the filtered fluid may flow axially within stand pipe 24 into outlet channel 23, and to outlet port 19.

In order to ensure that fluid flows through filter assembly 10 and filter media 16 in the foregoing manner, it may be necessary to substantially seal certain interfaces of filter assembly 10. For example, as illustrated in FIG. 1, it may be necessary to substantially prevent fluid flow through the interface between central opening of endcap 17 and the mating portion of head 13. If significant amounts of fluid are allowed to flow through this interface, the fluid could flow from inlet channels 21 to the internal volume of center tube 56, without flowing through media 16. This fluid could then flow into outlet channel 23, and to outlet port 19, without being filtered. Accordingly, as shown in FIG. 1, an O-ring, gasket, or other like sealing structure may be disposed between mating portions of head 13 and endcap 17 to prevent such fluid flows. Additionally, it may be necessary to substantially prevent fluid flow through the interface between an outer annular wall of head 13 and the mating portion of sidewall 27, in order to prevent fluid from leaking out of filter assembly 10 into the surrounding environment. Accordingly, as shown in FIG. 1, an O-ring, gasket, or other like sealing structure may be disposed between mating portions of head 13 and housing 12 to prevent such fluid flows. It is understood that one or more of head 13, sidewall 27, endcap 17, and/or other components of filter assembly 10 may include circumferential grooves, cut-outs, shoulders, ridges, and/or other structures for accommodating the sealing structures described above.

Figure 2:
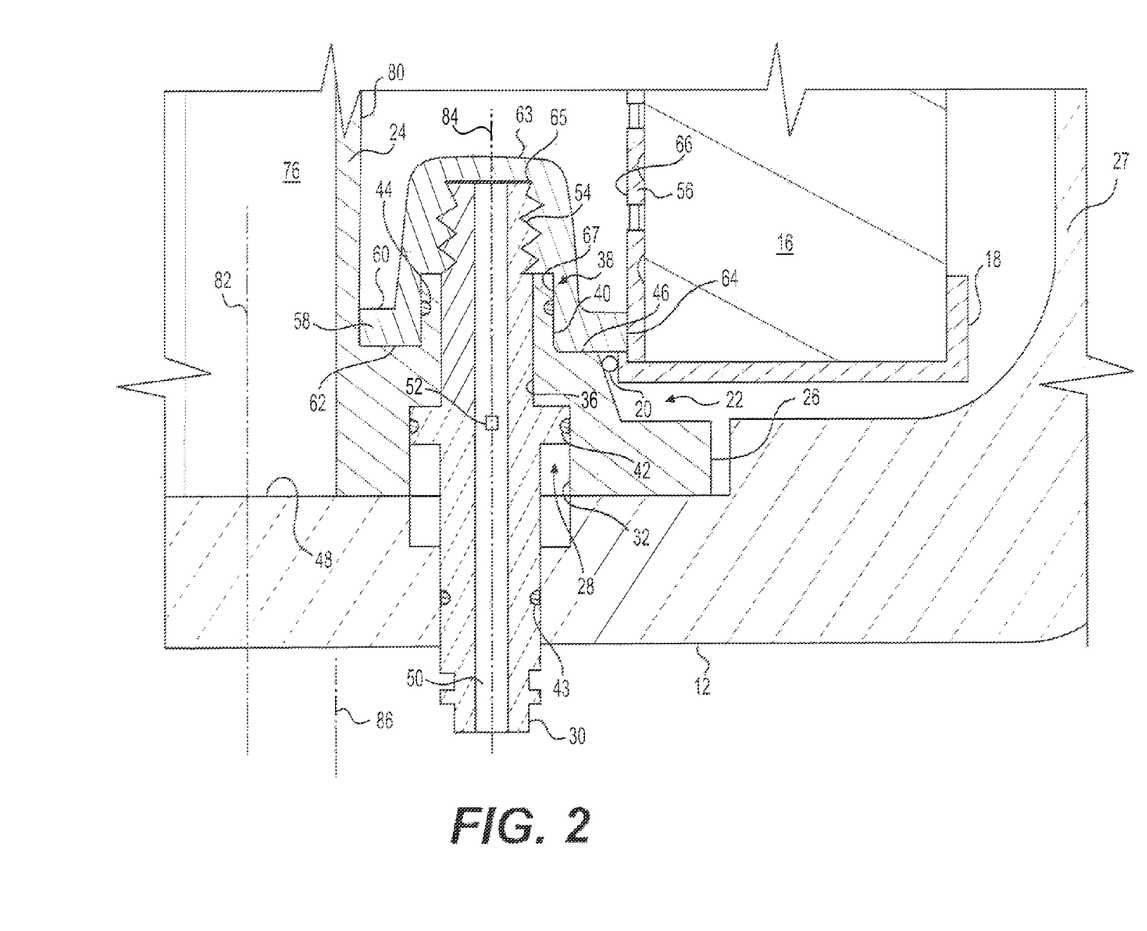
FIG. 2 shows a partial view of the filter assembly shown in FIG. 1.

It may also be necessary to substantially prevent fluid from flowing through the interface between endcap 18 and stand pipe 24 proximate first end 57 of center tube 56. If significant amounts of fluid are allowed to flow through this interface, the fluid could flow from gap 25 directly to the internal volume of center tube 56, without flowing through media 16. As shown in FIGS. 1, 2, and 6, an O-ring, gasket, or other like sealing structure 20 may be disposed at this interface to prevent such fluid flows. For example, to prevent fluid from bypassing filter media 16 at this interface, seal 20 may be disposed between a radially inner wall of endcap 18 and a corresponding outer surface of support structure 22, such as a top or outer surface of flange 26. Seal 20 may substantially seal this interface when filter element 14 is removably connected to support structure 22. Seal 20 may have various configurations and may, comprise, for example, any of the O-rings, gaskets, and/or other like sealing structures described above. Likewise, endcap 18, flange 26, stand pipe 24, and/or components of filter assembly 10 may include one or more circumferential grooves, cut-outs, shoulders, ridges, and/or other structures for accommodating seal 20.

Filter assembly 10 may also have provisions for selectively draining fluid from housing 12 and/or head 13. For example as shown in at least FIGS. 1 and 2, filter assembly 10 may have provisions for draining fluid from housing 12 via base 48 and/or other portions of housing 12. Alternatively, in the top load embodiment shown in FIG. 6, filter assembly 10 may have provisions for draining fluid from head 13.

In exemplary top and/or bottom load embodiments of the present disclosure drain port 28 may be configured to assist in removing such fluid from housing 12. For example, as shown in at least FIGS. 2 and 3, drain port 28 may include a first substantially cylindrical inner wall 32, and a second substantially cylindrical inner wall 36 spaced axially from first inner wall 32. Drain port 28 may also include a central longitudinal axis 84, and inner walls 32, 36 may extend circumferentially around and longitudinally along longitudinal axis 84. When support structure 22 is disposed on base 48, first inner wall 32 may be disposed adjacent base 48, and second inner wall 36 may be spaced from base, along longitudinal axis 84, by first inner wall 32, in exemplary embodiments, at least a portion abase 48 may be removed proximate inner wall 32, and in such embodiments, drain port 28 may be at least partially formed by and/or may extend into base 48. Alternatively, as shown in the exemplary top load embodiment of FIG. 6, at least a portion of drain port 28 may be formed by and/or may extend into head 13, and drain port 28 may be fluidly connected to a drain channel 31 of head 13 to facilitate removal of fluid from head 13. In such embodiments, fluid may be removed from head 13 via drain port 28, drain channel 31, and a corresponding port 33 of head 13 by removing filter element 14 from head 13. In particular, once filter element 14 is removed and/or the substantially fluid-tight seal formed by seal 20 is broken, fluid may be permitted to flow from head 13 into drain port 28 for removal.

Figure 3:
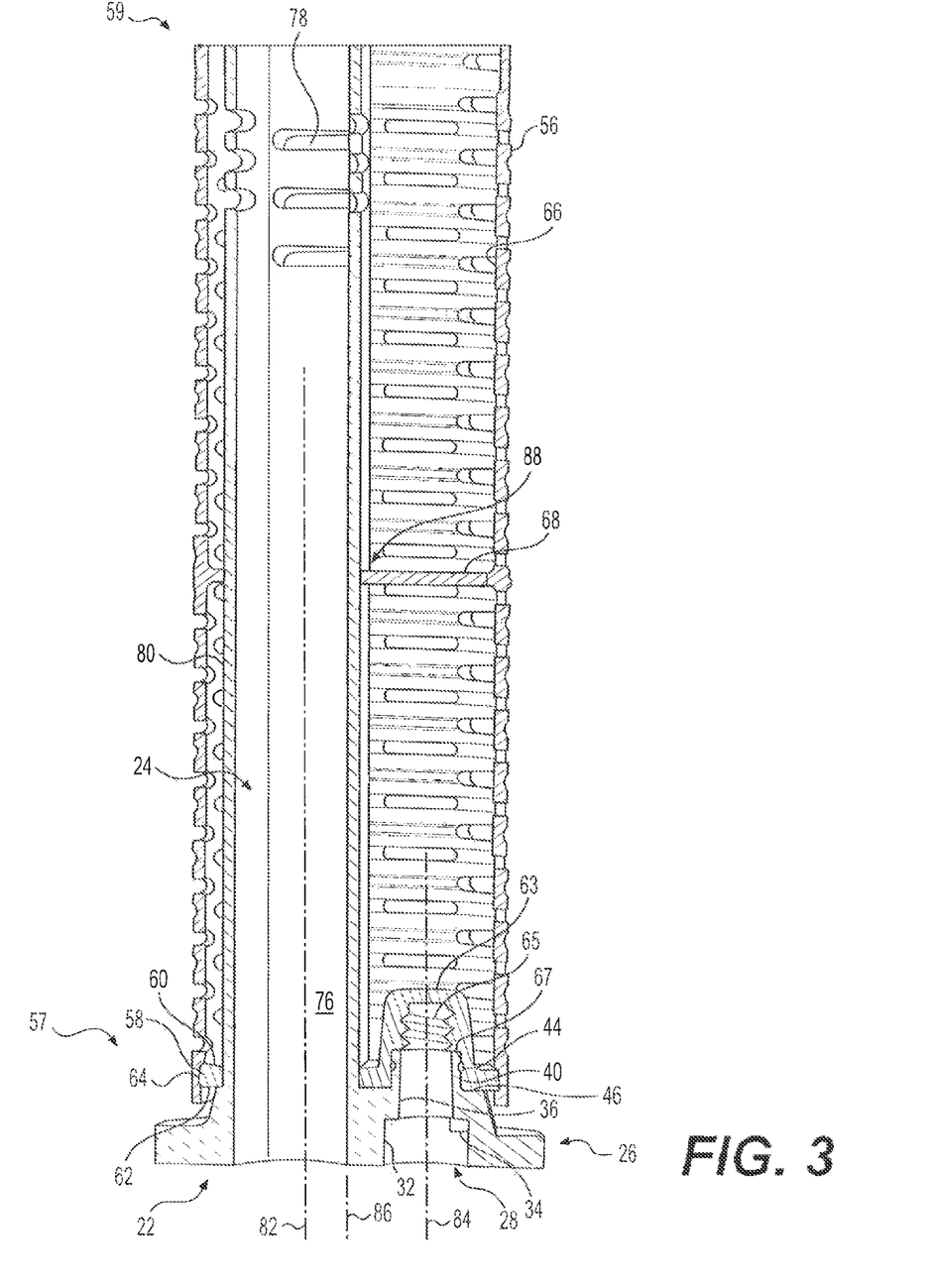
FIG. 3 shows a longitudinal cross-sectional view of a support structure associated with the filter assembly shown in FIG. 1.

In exemplary top and bottom load embodiments of the present disclosure, first inner wall 32 may have a larger diameter than a diameter of second inner wall 36. In alternative embodiments, however, first inner wall 32 may have a smaller diameter than a diameter of second inner wall 36. In such embodiments, drain port 28 may comprise a "stepped" port configured to assist in removing fluid from housing 12. To allow fluid contained in housing 12 to reach drain port 28, flange 26 may include one or more passages 34 as illustrated in exemplary FIGS. 3 and 4) fluidly connected to at least one of inner walls 32, 36. For example, as shown in FIG. 3, passage 34 may be fluidly connected to first inner wall 34 to allow for removal of fluid via drain port 28 of flange 26. To facilitate such fluid removal, passage 34 may extend from inner wall 34 to an outer wall of flange 26. Via the outer wall of flange 26, passage 34 may be in fluid communication with gap 25 or other internal spaces of housing 12.

In exemplary embodiments, drain port 28 may be configured to mate and form a substantially fluid-tight seal with a drain plug 30. Drain plug 30 may be movably disposed within drain port 28 and may be configured to form a substantially fluid-tight seal with at least one of first and second inner walls 32, 36. Drain plug 30 may include a threaded portion 54 including a series of threads, and such threads may be configured to mate with a corresponding series of threads included in a threaded portion 65 of drain port 28 and/or plate 58. Such corresponding threads may be formed by, for example, an inner wall 67 of a cap 63 formed by plate 58. In such embodiments, drain plug 30 may be secured within drain port 28 by, for example, engaging the corresponding threads of such threaded portions 54, 65. Likewise, drain plug 30 may assist in coupling filter element 14 to flange 26, base 48, and/or housing 12 by engaging threaded portion 54 with threaded portion 65 of cap 63. Drain plug 30 may define one or more ridges, arms, shoulders, extensions, and/or other like structures that may abut flange 26 and/or drain port 28 when the corresponding threads of such threaded portions 54, 65 are engaged. As exemplified in the configuration shown in FIGS. 1 and 2, such ridges, arms, shoulders, extensions, and/or other like structures of drain plug 30 may assist in securing filter element 14 to flange 26, base 48, and/or housing 12. Such structures may also assist in retaining drain plug 30 at least partially within housing 12 when filter element 14 is removed from housing 12 for maintenance. As shown in FIG. 6, in exemplary top load embodiments of the present disclosure, drain plug 30 may be omitted.

A seal 42 may seal the interface between drain plug 30 and drain port 28, and seal 42 may be disposed within, for example, a groove, ridge, cut-out, and/or other like structure of drain plug 30. When threaded portion 54 of drain plug 30 is fully threadedly engaged with threaded portion 65 (i.e., when drain plug 30 is in a closed position), drain plug 30 and/or seal 42 may block the passage of fluid from housing 12 into drain port 28. For example, in the closed position, drain plug 30 may block fluid the passage of fluid into drain port 28 via passage 34. Alternatively, when threaded portion 54 of drain plug 30 is at least partially threadedly disengaged from threaded portion 65 (i.e., when drain plug 30 is in an open position), drain plug 30 may permit passage of fluid from housing 12 into drain port 28 via passage 34. For example, as shown in FIG. 2, drain plug 30 may include a central channel 50 extending circumferentially around and longitudinally along a central longitudinal axis of drain plug 30. In exemplary embodiments, the longitudinal axis of drain plug 30 may be collinear with longitudinal axis 84 of drain port 84. Accordingly, drain plug 30 may be substantially hollow, and in exemplary embodiments, drain plug 30 may include one or more passages 52 fluidly connecting central channel 50 to an outer surface of drain plug 30. For example, passage 52 may extend from an outer surface of drain plug 30 to central channel 50, and may be configured to direct fluid received from drain port 28 and/or passage 34 to central channel 50 for removal from housing 12. It is understood, however, that when drain plug 30 is in the closed position, passage 52 and central channel 50 may be fluidly disconnected from at least passage 34.

In addition to seal 42, drain plug 30 may include a seal 43 configured to seal the interface between drain plug 30 and base 48. Seal 43 may be disposed within, for example, a groove, ridge, cut-out, and/or other like structure of drain plug 30, and may be configured to move with drain plug 30 relative to housing 12. Alternatively, seal 43 may be disposed within a groove, ridge, cut-out, and/or other like structure of base 48 and may remain stationary relative to drain plug 30. Seal 43 may form a substantially fluid-tight seal at the interface of drain plug 30 and housing 12 when drain plug 30 is in the open and closed positions.

As noted above, and as shown in at least FIGS. 1-4 and 6, support structure 22 may include stand pipe 24 and flange 26. In exemplary embodiments, stand pipe 24 and flange 26 may be formed as a single component. Alternatively, in additional embodiments, stand pipe 24 and flange 26 may be formed as separate components and may be fused, coupled, and/or otherwise connected in any known manner. Stand pipe 24 and flange 24 may be made from any metal, alloy, plastic, polymer, and/or other like materials known in the art. In exemplary embodiments, stand pipe 24 and flange 26 may be formed from the same material or, alternatively, stand pipe 24 and flange 26 may be formed from different materials. In further exemplary embodiments, one or both of stand pipe 24 and flange 26 may be integrally formed with housing 12. For example, one or both of stand pipe 24 and flange 26 may comprise a component of base 48. In such embodiments, housing 12 and one or both of stand pipe 24 and flange 26 may comprise a one-piece component of filter assembly 10. As shown in at least FIGS. 1 and 2, a portion of base 48 may be removed to accept one or both of stand pipe 24 and flange 26, and in such embodiments, one or both of stand pipe 24 and flange 26 may be at least partially disposed within base 48.

Alternatively, in the top load embodiment of FIG. 6, one or both of stand pipe 24 and flange 26 may be integrally formed with head 13. For example, head 13 and one or both of stand pipe 24 and flange 26 may comprise a one-piece component of filter assembly 10. As shown in FIG. 6, a portion of head 13 may be removed to accept one or both of stand pipe 24 and flange 26, and in such embodiments, one or both of stand pipe 24 and flange 26 may be at least partially disposed within head 13.

In exemplary embodiments, stand pipe 24 may comprise a substantially vertical component of flange 26 and may extend substantially perpendicularly from a top surface of flange 26 and/or from base 48, generally. Stand pipe 24 and/or portions of flange 26 may be configured to guide installation of fitter element 14 within housing 12 and/or head 13. For example, stand pipe 24 and/or flange 26 may include respective components, structures, surfaces, orifices, or other like features configured to mate with corresponding features of filter element 14 when filter element 14 is disposed within housing 12 or head 13. Such corresponding features may be configured to locate filter element 14 at a single circumferential position relative to longitudinal axes 84, 86. Additionally, as shown in FIGS. 2 and 3, stand pipe 24 may include a central longitudinal axis 82 that extends substantially parallel to axes 84, 86. The mating features of filter element 14 stand pipe 24 and/or flange 26 may also be configured to locate filter element 14 at a single circumferential position relative to longitudinal axis 82. As used herein, the term "circumferential position" may be defined as any 360 degree position or location about one or more of the longitudinal axes 82, 84, 86 described in the present disclosure.

For example, stand pipe 24 may include an outer wall 80 having at least one pilot feature 74. In exemplary embodiments, stand pipe 24 may also include an inner wall defining central channel 76 of stand pipe 24. In such embodiments, stand pipe 24 may be a substantially hollow guide structure of filter assembly 10, and passages 78 may fluidly connect outer wall 80 to central channel 76. As noted above, such passages 78 may permit filtered fluid to flow from within center tube 56 to central channel 76 of stand pipe 24, and into outlet channel 23 of head 13. Alternatively, in further embodiments, stand pipe 24 may be a substantially solid guide structure of filter assembly 10, and central channel 76 and passages 78 may be omitted.

Figure 4:
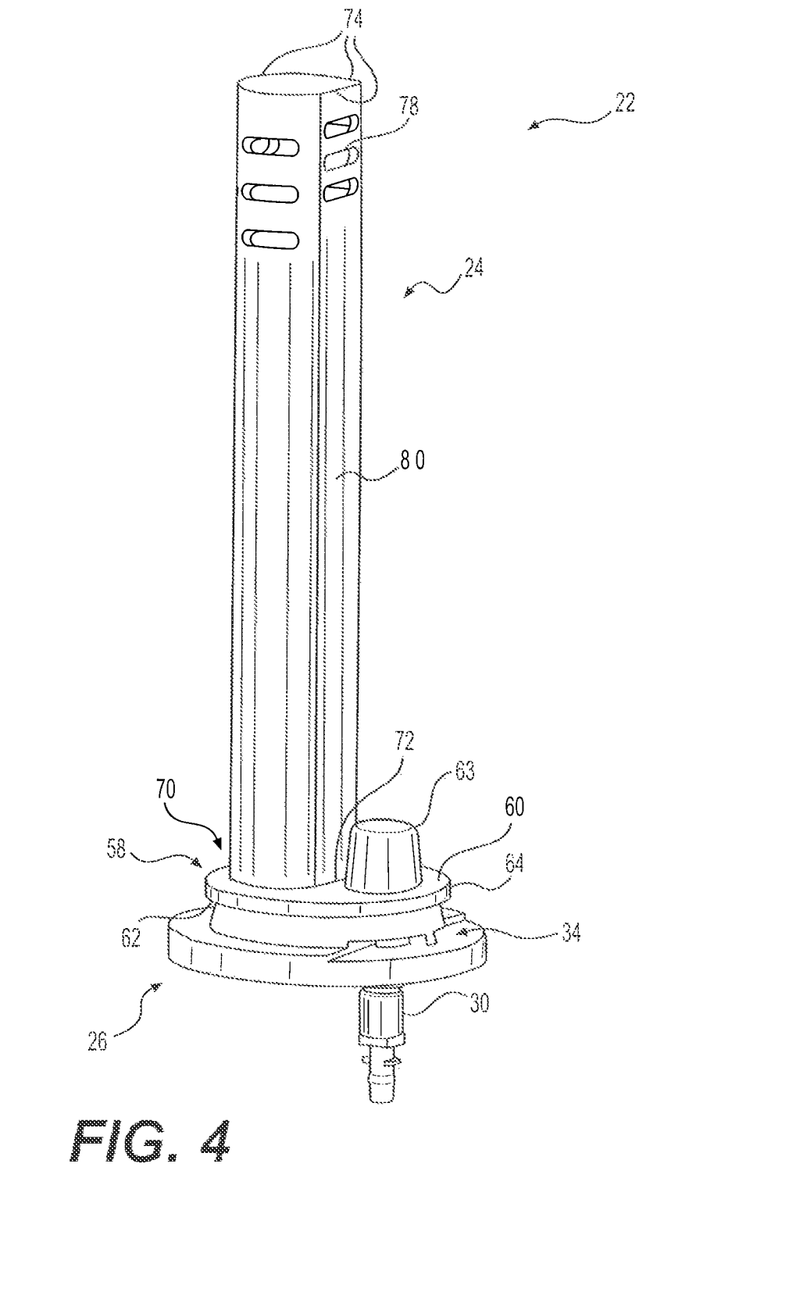
FIG. 4 shows a side view of the support structure illustrated in FIG. 3.
Figure 5:
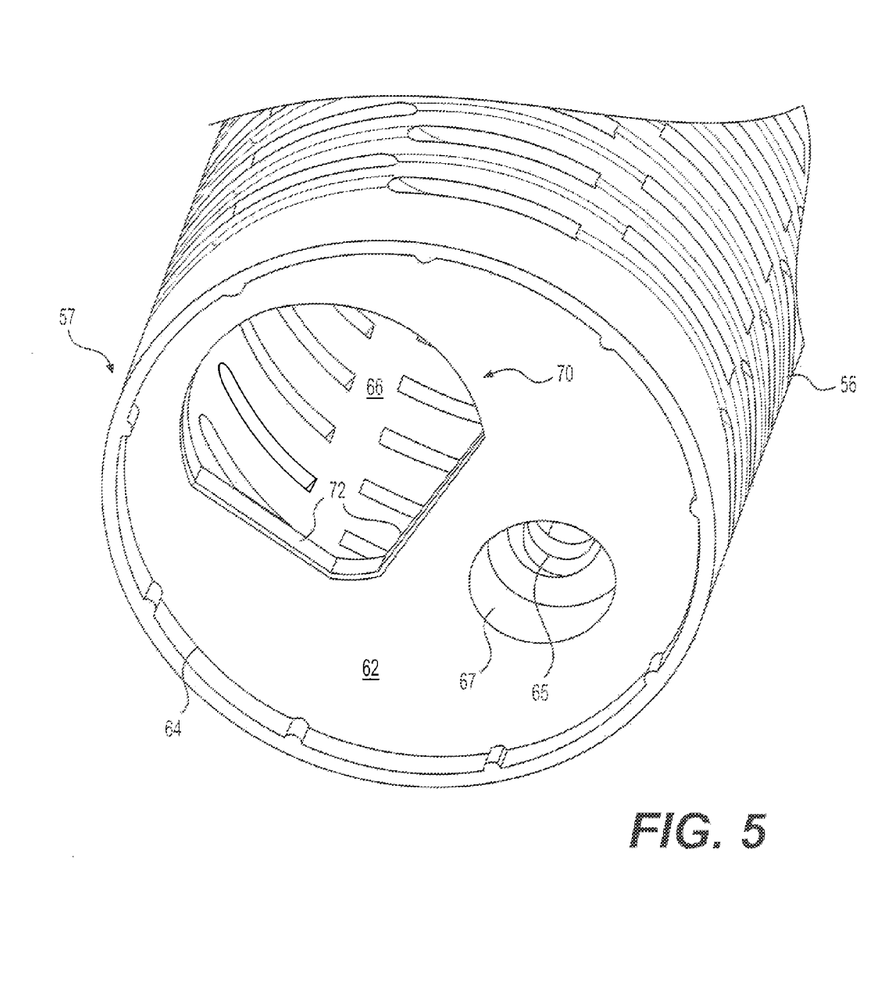
FIG. 5 shows an underside view of a center tube associated with the filter assembly of FIG. 1.

As shown in FIG. 4, pilot features 74 of outer wall 80 may include any rounded, curved, planar, angled, and/or keyed surface and/or structure of stand pipe 24. Pilot features 74 may extend along a portion of outer wall 80 or, in further exemplary embodiments, pilot features 74 may extend along an entire length of outer wall 80. In further exemplary embodiments, pilot features 74 of stand pipe 24 may be spaced axially from one another along longitudinal axis 82. Exemplary pilot features 74 may comprise at least one of a noncircular structure and an asymmetrical structure of stand pipe 24. Accordingly, an axial cross-section of stand pipe 24 may include at least one of a noncircular pilot feature 74 or an asymmetrical pilot feature 74 relative to longitudinal axis 82. As used herein, the term "axial cross-section" used in connection with pilot features of filter assembly 10 refers to a cross-section perpendicular to at least one of longitudinal axes 82, 84, 86.

Pilot features 74 of stand pipe 24 may mate with corresponding pilot features 72 formed by plate 58. For example, plate 58 may include an orifice 70 extending from a top surface 60 to a bottom surface 62 of plate 58. Orifice 70 may include one or more pilot features 72 configured to locate filter element 14 at a single circumferential position relative to one or more of longitudinal axes 82, 86. Pilot features 72 of plate 58 may mate with pilot features 74 of stand pipe 24 and, as shown in at least FIG. 5, may comprise at least one of a noncircular pilot feature 72 or an asymmetrical pilot feature 72. The shape of such mating pilot features 72, 74 may enable an operator to insert filter element 14 within housing 12 in only a single circumferential orientation relative to longitudinal axes 82, 86. Likewise, the shape of such mating pilot features 72, 74 may prevent installation and/or use of the wrong filter element 14 with filter assembly 10.

For example, plate 58 may be connected to center tube 56 at a location proximate first end 57. In exemplary embodiments, plate 58 may be connected to center tube 56 at or within first end 57. For example, plate 58 may include a substantially cylindrical outer wall 64, and outer wall 64 may be connected to inner wall 66 of center tube 56. In such embodiments, plate 58 may have an outer diameter substantially equal to a diameter of inner wall 66. Accordingly, positioning plate 58 such that pilot features 72 mate with pilot features 74 of stand pipe 24 may correspondingly orient center tube 56, filter media 16, and/or other components of filter element 14 at the single circumferential position described above. Orienting filter element 14 at such a single circumferential position relative to axes 82, 86 and/or within housing 12 or head 13, generally, may facilitate proper operation of filter assembly 10.

To further assist in orienting filter element 14 relative to housing 12 or head 13 during installation, center tube 56 may include one or more central plates 68. As shown in at least FIGS. 1 and 6, a central plate 68 may be disposed at a generally central axial position within center tube 56 and along longitudinal axis 86. In exemplary embodiments, central plate 68 may comprise a substantially planar, substantially disc-shaped structure connected to inner wall 66 of center tube 56. For example, central plate 68 may have an outer diameter substantially equal to the inner diameter of inner wall 66, and a substantially cylindrical outer all of central plate 68 may be connected to inner wall 66. Additionally, central plate 68 may include an orifice 88 having a configuration matching that of orifice 70. For example, orifice 88 of central plate 68 may include one or more pilot features substantially identical in shape, size, location, and configuration to pilot features 72 of plate 58. Such pilot features of central plate 68 may be configured to mate with corresponding pilot features 74 of stand pipe 24 as filter element 14 is installed within housing 12. Pilot features of central plate 68 may comprise, for example, at least one of a noncircular and an asymmetrical portion of orifice 88. Central plate 68 may also include one or more additional orifices or other like fluid passages to facilitate fluid flow through central plate 68 and within center tube 56.

As shown in at least FIGS. 1, 2, and 6, when filter element 14 is properly seated and/or otherwise installed within housing 12 or head 13, plate 58 may mate with flange 26. For example, flange 26 may include a substantially planar shoulder 46. Shoulder 46 may extend substantially perpendicular to stand pipe 24, and may extend circumferentially around stand pipe 24. In exemplary embodiments, shoulder 46 may be configured to support plate 58, and filter element 14 generally, during operation of filter assembly 10. For example, bottom surface 62 of plate 58 may be positioned on shoulder 46 when filter element 14 is disposed within housing 12, and seal 20 may form a substantially fluid-tight seal between flange 26 and endcap 18 on or proximate shoulder 46. In exemplary embodiments, shoulder 46 may comprise a raised portion and/or platform of flange 26, and when filter element 14 is disposed on shoulder 46, plate 58, endcap 18, and/or other portions of filter element 14 may be axially spaced from base 48.

In exemplary top and/or bottom load embodiments, flange 26 may include an extension 38 proximate shoulder 46. For example, extension 38 may comprise a substantially hollow, substantially cylindrical component of flange 26 extending substantially perpendicularly from shoulder 46. In exemplary embodiments, extension 38 may be fluidly connected to drain port 28 and may form at least a portion of drain port 28. In such embodiments, extension 38 may extend circumferentially around and longitudinally along longitudinal axis 84 of drain port 28. Likewise, in bottom load embodiments, extension 38 may be configured to accept and/or mate with a portion of drain plug 30 during operation of filter assembly 10. For example, as shown in FIG. 2, a portion of drain plug 30 may extend within and through extension 38 to mate with threaded portion 65 of cap 63. Extension 38 may comprise a substantially smooth, substantially cylindrical inner wall, and drain plug 30 may be configured to slide along and/or move adjacent to inner wall of extension 38.

Extension 38 may also include a substantially smooth, substantially cylindrical outer wall 40 opposite the inner wall. Outer wall 40 may form a substantially fluid-tight seal with plate 58 when plate 58 is disposed on shoulder 46 of flange 26. For example, outer wall 40 may form a substantially fluid-tight seal with inner wall 67 of cap 63. It is understood that mating threaded portion 54 of drain plug 30 with threaded portion 65 of plate 58 may facilitate forming such a fluid-tight seal. Additionally, inner wall 67 of cap 63 and/or outer wall 40 of extension 38 may include one or more seals 44 configured to assist in forming the substantially fluid-tight seal at the interface of extension 38 and cap 63. Seal 44 may have various configurations and may comprise, for example, any of the O-rings, gaskets, and/or other like sealing structures described above. Likewise, outer wall 40, inner wall 67, and/or components of filter assembly 10 may include one or more circumferential grooves, cut-outs, shoulders, ridges, and/or other structures for accommodating seal 44.

As noted above, stand pipe 24, plate 58, and other components of filter assembly 10 may include one or more pilot features to assist with orienting and/or locating filter element 14 at a single circumferential position about and/or otherwise relative to, for example, longitudinal axes 82, 86 during installation of filter element 14 within housing 12 or head 13. In exemplary embodiments, extension 38 may comprise a further pilot feature of flange 26. In particular, outer wall 40 of extension may be positioned relative to stand pipe 24 such that plate 58 may only be located at a single circumferential position relative to longitudinal axes 82, 86 when inner wall 67 of cap 63 is properly mated with outer wall 40. Additionally, outer wall 40 of extension 38 may include one or more noncircular and/or asymmetrical portions. Such noncircular and/or asymmetrical portions may extend along substantially an entire longitudinal length of outer wall 40. Such noncircular and/or asymmetrical portions of outer wall 40 may comprise, for example, one or more planar, angled, rounded, and/or other like surfaces of outer wall 40. Such portions of outer wall 40 may also include, for example, one or more grooves, notches, cut-outs, knobs, keys, and/or irregular structures extending radially outward from outer wall 40. In such exemplary embodiments, inner wall 67 of cap 63 may include a corresponding structure and/or portion configured to mate with such portions of outer wall 40 when filter element 14 is positioned within housing 12. Such mating pilot features and/or portions of outer wall 40 and inner wall 67 may further assist in orienting filter element 14 relative to axes 82, 86.

As shown in FIGS. 1-4 and 6, cap 63 may comprise a component of plate 58 extending substantially perpendicularly from top surface 60. Cap 63 may be substantially hollow, and may have a substantially cylindrical, substantially conical, substantially tapered, and/or any other like shape. In exemplary embodiments, cap 63 may comprise a protuberance of plate 58 extending circumferentially around and longitudinally along central longitudinal axis 84 of drain port 28, and a central longitudinal axis of cap 63 may be collinear with longitudinal axis 84. As noted above, cap 63 may include threaded portion 65 and a substantially smooth, substantially cylindrical inner wall 67. Inner wall 67 may have a larger diameter than a diameter of threaded portion 65 to facilitate insertion and removal of threaded portion 54 of drain plug 30. Additionally, mating threaded portion 54 of drain plug 30 with threaded portion 65 of cap 63 may securely couple filter element 14 to flange 26 and/or housing 12. Moreover, as shown in FIG. 2, threaded portion 65 of cap 63 may be spaced from bottom surface 62 by substantially smooth inner wall 67. Such spacing may be advantageous in forming the substantially fluid-tight seal at the interface of inner wall 67 and outer wall 40 of extension 38.

As shown in at least FIGS. 1, 3, and 6, plate 58, cap 63, drain port 28, stand pipe 24, and/or components thereof, may each be disposed at least partially within center tube 56 when filter element 14 is disposed within housing 12. For example, plate 58, drain port 28, cap 63, stand pipe 24, and/or components thereof, may be disposed radially inward of the inner circumference of center tube 56 defined by inner wall 66. In such embodiments, one or more components of plate 58, drain port 28, and stand pipe 24 may also be disposed radially inward of the inner circumference of center tube 56. For instance, orifice 70, cap 63, and/or other components of plate 58 may be disposed radially inward of inner wall 66. Moreover, plate 58, drain port 28, cap 63, stand pipe 24, and/or components thereof, may be disposed at least partially axially within the internal volume of center tube 56 defined by inner wall 66. For example, at least a portion of inner wall 67, threaded portion 65, top surface 60, orifice 70, outer wall 64, and/or other components or surfaces of plate 58 may be disposed axially within the internal volume of center tube 56. Such portions of these components may be disposed, for example, between first and second ends 57, 59 of center tube 56 and radially within inner wall 66. Additionally, in exemplary embodiments, longitudinal axes 82, 84 may be radially offset from each other, as well as from longitudinal axis 86. For example, while longitudinal axes 82, 84 may or may not be disposed coplanar with longitudinal axis 86, axes 82, 84 may be spaced radially from longitudinal axis 86. Also, longitudinal axis 82 may be spaced radially from longitudinal axis 86 by a first distance, and longitudinal axis 84 may be spaced radially from longitudinal axis 86 by a second distance different from (i.e., greater than or less than) the first distance.

Filter assembly 10 and the components thereof are not limited to the configurations shown in FIGS. 1-6. Filter assembly 10 may include pilot features for mating filter element 14 to other portions of filter assembly 10 in different components of the filter assembly 10. For example, in lieu of, or in addition to the pilot features 72, 74 described herein, filter assembly 10 may include additional pilot features in head 13 and/or housing 12. Additionally, the configuration of various other aspects of filter assembly 10 may differ from that shown in FIGS. 1-6. Moreover, pilot features 72, 74 described above may include a recess extending radially inward relative to longitudinal axis 82, as well as a projection extending radially outward relative to longitudinal axis 82. For example, a recess of pilot feature 74 may be configured to mate with an projection of pilot feature 72, or vice versa.

INDUSTRIAL APPLICABILITY

Filter assembly 10 and filter element 14 may have use in any application requiring fluid filtering. For example, filter assembly 10 may be used in conjunction with farming, construction, mining, power generation, and/or other like equipment. In particular, filter assembly 10 may be fluidly connected to an internal combustion engine or other like machine component, and may be used to remove dirt or other harmful contaminants from oil, fuel, or other fluids utilized by such components.

The disclosed embodiments of filter assembly 10 and filter element 14 may provide certain advantages in such applications. For example, as discussed above, the various pilot features of filter element 14 and flange 26 may facilitate installation and assembly of filter element 14 within housing 12 and/or head 13. In particular, filter element 14 may be installed into housing 12 or head 13 by rotating filter element 14 until pilot feature 72 of plate 58 aligns and/or mates with pilot feature 74 of stand pipe 24. Such mating may occur while filter element 14 is disposed substantially axially outside of the internal volume of housing 12 (or outside of an analogous internal volume of head 13 in a top load embodiment). Additionally, such mating may occur only when filter element 14, plate 58, and/or orifice 70 are located at a single circumferential position relative to one or both of longitudinal axes 82, 86. Once properly aligned in this way, filter element 14 may be inserted into housing 12 or head 13 along longitudinal axis 82 of stand pipe 24. For example, pilot feature 72 of plate 58 may slide along and/or may otherwise be guided by pilot feature 74 of stand pipe 24 until bottom surface 62 of plate 58 is seated on shoulder 46 of flange 26. During such installation, pilot features defined by orifice 88 of center plate 68 may also mate with pilot feature 74 of stand pipe 24 to provide additional circumferential guidance and/or alignment relative to longitudinal axes 82, 86. Additionally, mating outer wall 40 of extension 38 with inner wall 67 of cap 63 as bottom surface 62 of plate 58 is seated on shoulder 46 may provide still further circumferential guidance relative to longitudinal axes 82, 86. Such circumferential alignment of filter element 14 may ensure proper installation of filter element 14 within housing 12 or head 13 prior to use. Such circumferential alignment may also facilitate the proper formation of substantially fluid-tight seals at, for example, the interface of inner wall 67 and outer wall 40 as well as the interface of flange 26 and endcap 18. The pilot features described herein may also be used to help prevent installation of incorrect filter elements 14 in a filter assembly 10.

Moreover, since drain plug 30, drain port 28, and/or other cooperating drainage components of filter assembly 10 are disposed radially inward of the inner circumference of center tube 56, this inner circumference need not be enlarged or otherwise modified to accommodate such structures. Instead, the internal volume defined by inner wall 66 of center tube 56 may be shared by at least portions of stand pipe 24, cap 63, drain port 28, plate 58, and/or drain plug 30. By disposing at least a portion of such components axially within the internal volume of center tube 56, the axial length and overall footprint of filter assembly 10 may be minimized.

Finally, during drainage of filter assembly 10, drain plug 30 may be transitioned from the closed position to the open position described above. In the closed position, drain plug 30 may function to couple filter element 14 to housing 12 and/or flange 26 through interaction of mating threaded portions 65, 54. On the other hand, in the open position, arms, extensions, and/or other structures of drain plug 30 may cooperate with a portion of base 48 such that drain plug 30 may be retained within housing 12 while filter element 14 is removed. Such retention of drain plug 30 may prevent inadvertently misplacing drain plug 30 during maintenance of filter assembly 10.

It will be apparent to those skilled in the art that various modifications and variations can be made in the disclosed system and methods without departing from the scope of the disclosure. Other embodiments of the disclosed system and methods will be apparent to those skilled in the art from consideration of the specification and practice of the system and methods disclosed herein. It is intended that the specification and examples be considered as exemplary only, with a true scope of the disclosure being indicated by the following claims and their equivalents.

What is claimed is:
1. A filter element, comprising:
a substantially cylindrical center tube having a first end, a second end opposite the first end, and a central longitudinal axis;
filter media extending circumferentially around and longitudinally along the center tube; and
a plate connected to the center tube proximate the first end, the plate including an orifice and a cap, the orifice having a pilot feature configured to locate the filter element at a single circumferential position relative to the longitudinal axis, the cap extending from a top surface of the plate toward the second end and having an inner wall configured to mate with a drain plug, wherein the orifice and the cap are disposed radially inward of an inner circumference of the center tube, and at least one of the orifice and the cap extends circumferentially around an additional longitudinal axis spaced radially from the central longitudinal axis of the center tube, and a central longitudinal axis of the orifice and a central longitudinal axis of the cap extend substantially parallel to, and are spaced radially from, the central longitudinal axis of the center tube.

2. The filter element of claim 1, wherein the orifice is configured to mate with a stand pipe extending from the first end to proximate the second end.

3. The filter element of claim 2, wherein the pilot feature of the plate is configured to mate with a corresponding pilot feature of the stand pipe and to locate the filter element at a single circumferential position relative to the stand pipe.

4. The filter element of claim 2, wherein the center tube further includes an additional plate disposed within the inner circumference axially between the first and second ends, the additional plate including an orifice having a pilot feature configured to mate with a corresponding pilot feature of the stand pipe.

5. The filter element of claim 1, wherein the pilot feature comprises at least one of a noncircular and an asymmetrical portion of the orifice.

6. The filter element of claim 1, wherein the plate includes a substantially cylindrical outer wall connected to an inner wall of the center tube forming the inner circumference.

7. The filter element of claim 1, wherein at least a portion of the inner wall of the cap is disposed axially within an internal volume of the center tube formed by an inner wall of the center tube.

8. A filter element, comprising:
a substantially cylindrical center tube having a first end, a second end opposite the first end, and a central longitudinal axis;
filter media extending circumferentially around and longitudinally along the center tube; and
a plate connected to the center tube proximate the first end, the plate including an orifice and a cap, the orifice having a pilot feature configured to locate the filter element at a single circumferential position relative to the longitudinal axis, the cap extending from a top surface of the plate toward the second end and having an inner wall configured to mate with a drain plug, wherein
the orifice and the cap are disposed radially inward of an inner circumference of the center tube, and at least one of the orifice and the cap extends circumferentially around an additional longitudinal axis spaced radially from the central longitudinal axis of the center tube, and
the inner wall of the cap includes a threaded portion configured to mate with a corresponding threaded portion of the drain plug.

9. The filter element of claim 8, wherein the plate further includes a bottom surface, and wherein the inner wall further includes a smooth portion disposed axially between the threaded portion and the bottom surface, a seal being disposed on the smooth portion separate from the drain plug.

10. A filter assembly, comprising:
a support structure comprising a stand pipe and a flange connected to the stand pipe, the stand pipe having a first central longitudinal axis, and the flange having a drain port configured to mate with a drain plug; and
a filter element removably connected to the support structure, the filter element including
a substantially cylindrical center tube, the center tube having a first end, a second end opposite the first end, an inner wall forming an inner circumference of the center tube, and a second central longitudinal axis, and a plate connected to the center tube proximate the first end, the plate including an orifice and a cap, the orifice mating with the stand pipe to locate the filter element at a single circumferential position relative to the first longitudinal axis of the stand pipe, the cap extending from a top surface of the plate toward the second end and having an inner wall forming a substantially fluid-tight seal with the flange, wherein
the stand pipe, the orifice, and the cap are disposed radially inward of the inner circumference of the center tube, the first longitudinal axis of the stand pipe being spaced radially from the second longitudinal axis of the center tube.

11. The filter assembly of claim 10, wherein the plate includes a pilot feature comprising at least one of a noncircular and an asymmetrical portion of the orifice, and an outer wall of the stand pipe includes a pilot structure corresponding to the pilot structure of the plate.

12. The filter assembly of claim 11, wherein the pilot structure of the stand pipe extends along substantially an entire length of the outer wall.

13. The filter assembly of claim 10, wherein the flange supports a bottom surface of the plate such that the stand pipe extends through the orifice, and an extension of the flange forming a portion of the drain port forms the substantially fluid-tight seal with the inner wall of the cap.

14. The filter assembly of claim 10, wherein the drain port includes a substantially cylindrical inner wall configured to form a substantially fluid-tight seal with the drain plug, the flange including a passage fluidly connected to the inner wall of the drain port.

15. The filter assembly of claim 10, further including a housing, the support structure and the filter element being disposed within the housing, and the drain plug extending through the housing to mate with the cap.

16. The filter assembly of claim 15, wherein the drain plug mates with a threaded portion of the inner wall of the cap and forms a substantially fluid-tight seal with an inner wall of the drain port.

17. The filter assembly of claim 10, wherein the first longitudinal axis of the stand pipe and a third central longitudinal axis of the drain port extend substantially parallel to, and are spaced radially from, a the second longitudinal axis of the center tube.

* * * * *